United States Patent
Pinel et al.

(10) Patent No.: US 11,140,308 B2
(45) Date of Patent: Oct. 5, 2021

(54) LIFE-LOGGING SYSTEM WITH THIRD-PERSON PERSPECTIVE

(71) Applicant: International Business Machines Corporation, Armonk, NY (US)

(72) Inventors: Florian Pinel, New York, NY (US); Benjamin L. Johnson, Baltimore, MD (US); Donna K. Byron, Petersham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/045,262

(22) Filed: Jul. 25, 2018

(65) Prior Publication Data
US 2020/0036885 A1  Jan. 30, 2020

(51) Int. Cl.
*H04N 5/232* (2006.01)
*H04N 1/00* (2006.01)
*G06Q 10/10* (2012.01)

(52) U.S. Cl.
CPC ..... *H04N 5/23206* (2013.01); *H04N 1/00209* (2013.01); *H04N 1/00244* (2013.01); *H04N 5/23296* (2013.01); *H04N 5/23299* (2018.08); *G06Q 10/1095* (2013.01)

(58) Field of Classification Search
CPC .......... H04N 5/23206; H04N 5/23299; H04N 1/00209; H04N 1/00244; H04N 5/23296
See application file for complete search history.

(56) References Cited

U.S. PATENT DOCUMENTS

| 7,756,322 | B2 | 7/2010 | Saitou et al. |
| 9,170,318 | B1 | 10/2015 | Bozarth et al. |
| 2009/0021591 | A1 | 1/2009 | Sako |
| 2009/0115865 | A1 | 5/2009 | Yamada et al. |

(Continued)

FOREIGN PATENT DOCUMENTS

| KR | 20090112349 A | 10/2009 |
| WO | 2015120413 A1 | 8/2015 |

OTHER PUBLICATIONS

Stapley, J., "A questionable future: Remembering the lifelogging camera," Aug. 9, 2016, 11 pages. Retrieved from the Internet: URL: https://www.wareable.com/cameras/whatever-happened-to-lifelogging-cameras-876 [retrieved on Jul. 25, 2018].

(Continued)

*Primary Examiner* — Jamie J Atala
*Assistant Examiner* — Hesham K Abouzahra
(74) *Attorney, Agent, or Firm* — Troutman Pepper Hamilton Sanders LLP

(57) ABSTRACT

A life-logging system is configured to register a plurality of cameras and a plurality of users to a life-logging network. The life-logging system receives a plurality of camera profiles associated with the plurality of cameras and a user profile associated with a user. The life-logging system determines location information associated with the user and identifies a camera of the plurality of cameras for capturing an image of the user based on the plurality of camera profiles, the user preferences, and the location information. The life-logging system arranges for the image of the user captured by the camera to be delivered to a client device.

16 Claims, 13 Drawing Sheets

(56) References Cited

U.S. PATENT DOCUMENTS

| | | | |
|---|---|---|---|
| 2011/0055765 A1* | 3/2011 | Neubrand | H04N 1/32122 715/838 |
| 2011/0115930 A1 | 5/2011 | Knlinets et al. | |
| 2011/0276396 A1 | 11/2011 | Rathod | |
| 2012/0162436 A1 | 6/2012 | Cordell et al. | |
| 2012/0237082 A1* | 9/2012 | Sengupta | G06K 9/6212 382/103 |
| 2013/0038756 A1 | 2/2013 | Cheng | |
| 2013/0063550 A1 | 3/2013 | Ritchey et al. | |
| 2013/0097196 A1* | 4/2013 | Fuse | G06F 16/50 707/758 |
| 2014/0129942 A1 | 5/2014 | Rathod | |
| 2014/0267799 A1 | 9/2014 | Sadasivam et al. | |
| 2015/0086088 A1* | 3/2015 | King | G06K 9/00154 382/118 |
| 2015/0207976 A1* | 7/2015 | Sako | H04N 21/42202 348/211.2 |
| 2015/0248587 A1* | 9/2015 | Oami | H04N 7/181 382/103 |
| 2015/0334356 A1* | 11/2015 | Kim | H04N 5/23219 348/143 |
| 2016/0191434 A1 | 6/2016 | Rice | |
| 2017/0032178 A1* | 2/2017 | Henry | G06K 9/00308 |
| 2019/0007646 A1* | 1/2019 | Saito | H04N 5/247 |

OTHER PUBLICATIONS

Ashbrook, D., et al., "Learning Significant Locations and Predicting User Movement with GPS," Proceeding ISWC '02 Proceedings of the 6th IEEE International Symposium on Wearable Computers, p. 101, Oct. 7-10, 2002.

Wang, J., et al., "Learning Fine-grained Image Similarity with Deep Ranking," Proceeding CVPR '14 Proceedings of the 2014 IEEE Conference on Computer Vision and Pattern Recognition, pp. 1386-1393, Jun. 23-28, 2014.

"The World's Most Wearable HD Video Camera—Narrative Clip 2," 9 pages. Retrieved from the Internet: URL: http://getnarrative.com [retrieved on Jul. 25, 2018].

"Wearable.com," 1 page. Retrieved from the Internet: URL: https://wearable.com/index.html [retrieved on Jul. 25, 2018].

* cited by examiner

LIFE-LOGGING SYSTEM WITH THIRD-PERSON PERSPECTIVE

TECHNICAL FIELD

The present application relates generally to a life-logging system and, more particularly, to a life-logging system which presents a third-person perspective of the target individual.

BACKGROUND

As the availability and capabilities of cameras have increased, more and more applications have been crafted for photographs and videos of everyday life. For instance, life-logging systems developed as a means to keep track of events that occur throughout a day by periodically capturing and storing images or video. Conventional life-logging systems are typically arranged from a first-person point of view because the person or subject of the life-logging is carrying or wearing the camera.

While life-logging systems perform well enough and capture some interesting moments that may not otherwise be recorded, they are less than ideal and have not gained wide acceptance to this point. First, life-logging systems (i.e., those that work by periodically capturing images or recording video) end up capturing many unnecessary images that do not depict anything of significance or value and the interesting images may be scarce and/or repetitive. It is difficult to effectively and efficiently capture varied and interesting images or videos with conventional systems.

Further, even when a system uses or adds context to captured images, there is difficulty in arranging the subjects of the images to be from a desired perspective. Because the person associated with the life-logging system is often wearing the camera, they are not in any of the pictures or videos, which renders the life-logging results as more of a record of what the person saw rather than a diary or highlight reel of the person's experiences. After all, the rise in ubiquity of cameras has led to the popularity of "selfies," a feature which is difficult to achieve in a life-logging system.

The present disclosure is directed to overcoming these and other problems of the prior art to provide an improved life-logging system which may provide more desirable results through a more efficient logging process.

SUMMARY

In some embodiments, the present disclosure describes a computer-implemented method for capturing images of a user. The method includes receiving, by a camera registration unit, a plurality of camera profiles associated with a plurality of cameras, and receiving, by a user registration unit, a user profile associated with the user. The user profile includes user preferences. The method further includes determining, by a tracking unit, location information associated with the user, and identifying, by a planning unit, a camera of the plurality of cameras for capturing an image of the user based on the plurality of camera profiles, the user preferences, and the location information. The method also includes arranging, by a communication unit, for the image of the user captured by the camera to be delivered to a client device.

In other embodiments the present disclosure describes a life-logging system including a processing device configured to execute instructions stored in a memory device. The life-logging system is configured to register, by a camera registration unit, a plurality of cameras to a life-logging network, and register, by a user registration unit, a user to the life-logging network. The life-logging system is further configured to receive a plurality of images of the user captured by the plurality of cameras, analyze, by a storage unit, the plurality of images to select a subset of images based on a novelty score of the image, and deliver, by a communication unit, the subset of images to a client device associated with the user.

In other embodiments, the present disclosure also describes a life-logging system including a processing device configured to execute instructions stored in a memory device. The life-logging system is configured to register, by a camera registration unit, a plurality of cameras to a life-logging network, and receive, by a tracking unit, an indication of a location of user. The life-logging system is further configured to select, by a planning unit, a camera of the plurality of cameras based on the location of the user, determine, by the planning unit, to capture an image of the user based on camera parameters and user preferences, and transmit, by a communication unit, an instruction to the camera to capture an image of the user based on the determination.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
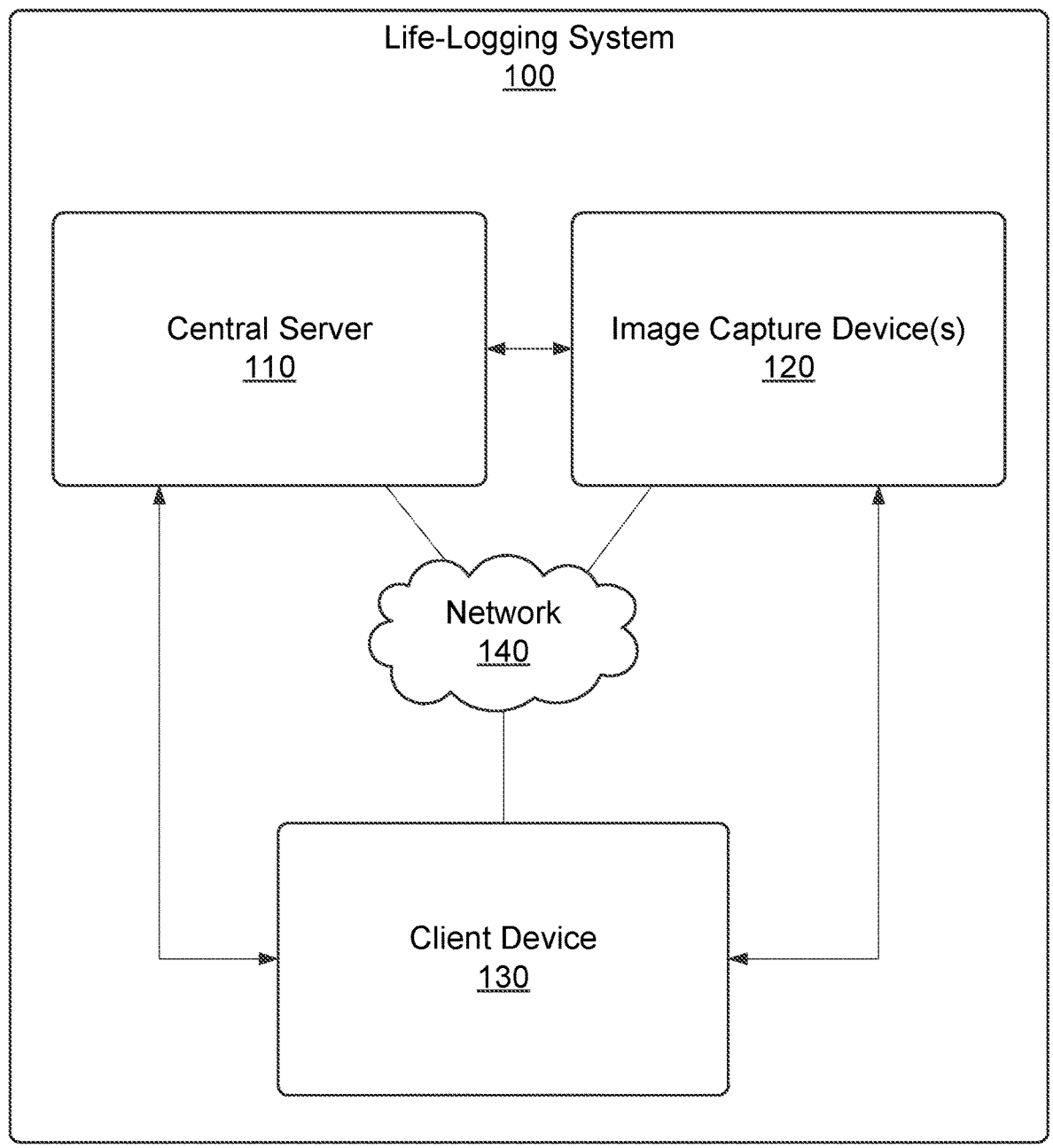
FIG. 1 depicts a schematic diagram of one illustrative embodiment of a life-logging system, consistent with disclosed embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

As an overview, the present disclosure describes a life-logging system which utilizes a network of cameras and processing of user information to determine when, where, and how to capture images using one or more of the cameras. The life-logging system may include a central server which executes a life-logging decisioning process which includes the receipt of information about a user and the use of the information to decide where the individual will be located. The central server may use the information about an individual and knowledge of the network of cameras and recording devices to produce an itinerary which identifies specific cameras and opportunities for capturing images of the user. For instance, the central server may identify a user's travel plan and find cameras which are located along the route. As the user approaches a particular location, the central server and/or the user's client device coordinate for an image to be captured.

In some embodiments, the central server may operate to control the capture and/or storage of images in order to help to ensure that the images which are ultimately stored and/or delivered to the user have some level of interest, value, and/or quality, as opposed to conventional life logging systems which generally collect a multitude of repetitive or insignificant images that outnumber and obscure the valuable images. The central server is configured to analyze and/or consider several factors in determining which cameras may be used to capture an image and which captured images should be stored or transmitted to the user. For example, the central server may consider user preferences, camera parameters/capabilities, previous captured images, user location information, user likely future locations, image data, prospective image data, and the like.

FIG. 1 depicts a schematic diagram of one illustrative embodiment of a life-logging system 100. The life-logging system 100 includes a central server 110, a plurality of image capture devices 120, and a client device 130 which are connected through a network 140. The central server 110, image capture devices 120, and client device 130 are functionally represented as singular separate components but it should be understood that the disclosed embodiments are not so limited. Moreover, the systems may be combined in some embodiments.

The central server 110 may be implemented in hardware and/or software and may include various constituent components which form the central server 110. These components may include, for example, processing devices, memory devices, and input/output devices which are configured to send and receive information through network 140. Moreover, the central server 110 may include one or more software units or modules that may be stored by the memory devices and that may be executed by the processing devices in order to perform one or more processes associated with the disclosed embodiments.

The image capture devices 120 may be implemented in hardware and/or software and may include various constituent components, such as cameras, microphones, and/or other recording devices, along with processing devices and memory devices which control the mechanical components of the image capture devices 120. The image capture devices 120 can further includes communication components which permit the image capture devices 120 to communicate with other components of the life-logging system 100. The terms image capture device and camera may be used herein interchangeably and generally refer to a device capable of capturing an image, including the recording of a video, and is not limited by any implied or inherent components of any specific type of camera.

The client device 130 may be implemented in hardware and/or software and may include various constituent components which form the client device 130. These components may include, for example, a processing device in communication with a memory and one or more software or hardware modules and/or units for executing software instructions, and one or more input and output devices, such as a touch screen, speaker, and/or microphone.

In some embodiments, the client device 130 is a mobile device (e.g., smart phone, tablet, etc.). In still other embodiments, the client device 130 is a laptop or desktop computer. In some embodiments, the client device 130 may include a mobile application service for storing and executing one or more mobile applications and/or a web browser installed thereon for navigating to websites. For example, the client device 130 may store and execute a life-logging application which facilitates one or more of the processes described herein.

The network 140 may be a local or global network and may include wired and/or wireless components and functionality which enable communication between the central server 110, image capture devices 120, and the client device 130. The network 140 may be embodied by the Internet, provided at least in part via cloud services, and/or may include one or more communication devices or systems which enable data transfer to and from the systems and components of the central server 110, image capture devices 120, and/or the client device 130.

The central server 110, image capture devices 120, and client device 130 are all positioned in a relative locations which enable connections to the network 140. For example, each may include a wireless communication device which enables information to be both received and transmitted during one or more processes associated with the disclosed embodiments.

In accordance with some exemplary embodiments, the elements of life-logging system 100 include logic implemented in specialized hardware, software executed on hardware, or any combination of specialized hardware and software executed on hardware, for implementing the life-logging system 100. In some exemplary embodiments, the life-logging system 100 may be or include the IBM Watson™ system available from International Business Machines Corporation of Armonk, N.Y., which is augmented with the mechanisms of the illustrative embodiments described hereafter.

Figure 2:
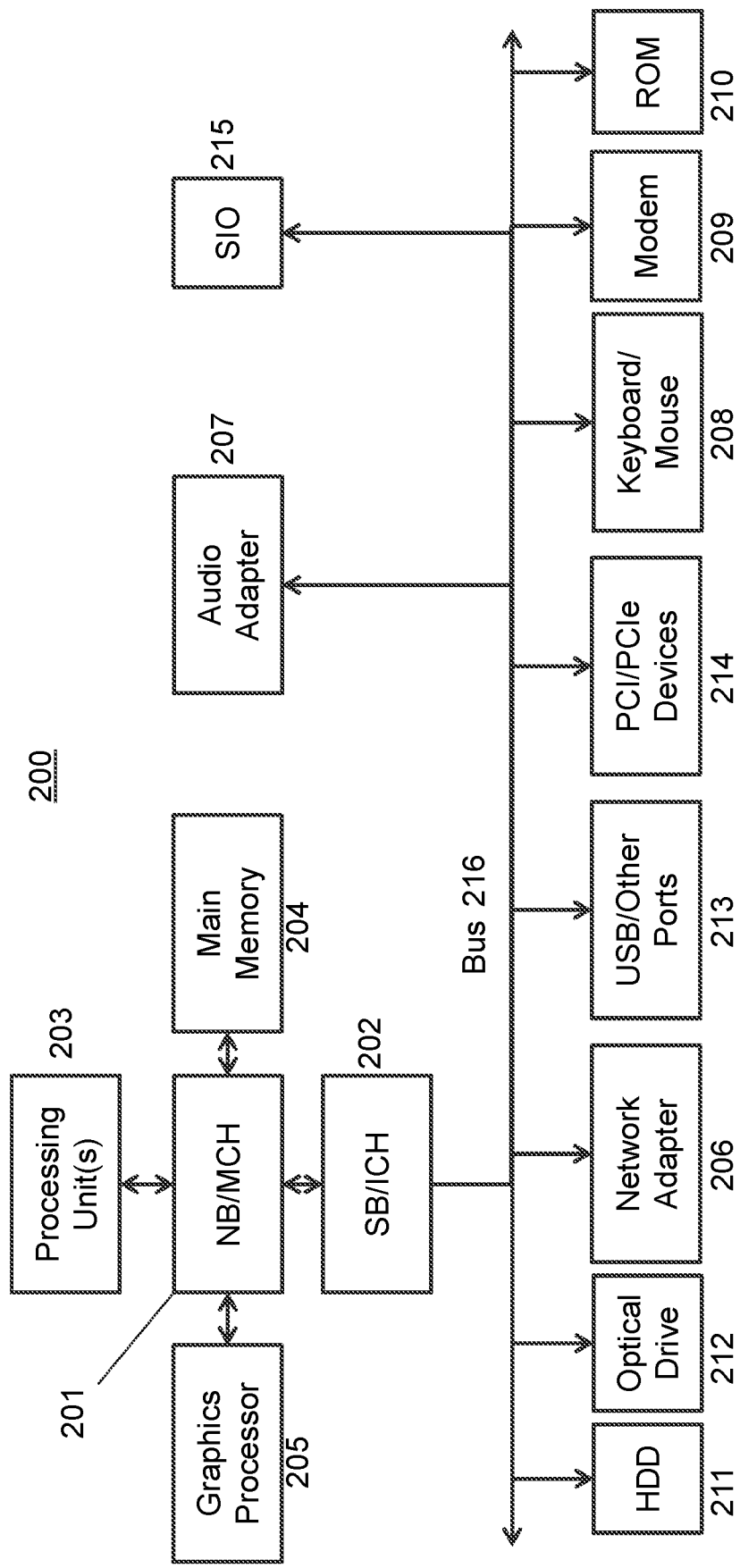
FIG. 2 depicts a block diagram of an example data processing system in which aspects of the illustrative embodiments may be implemented, consistent with disclosed embodiments.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the life-logging 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the life-logging system 100 can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
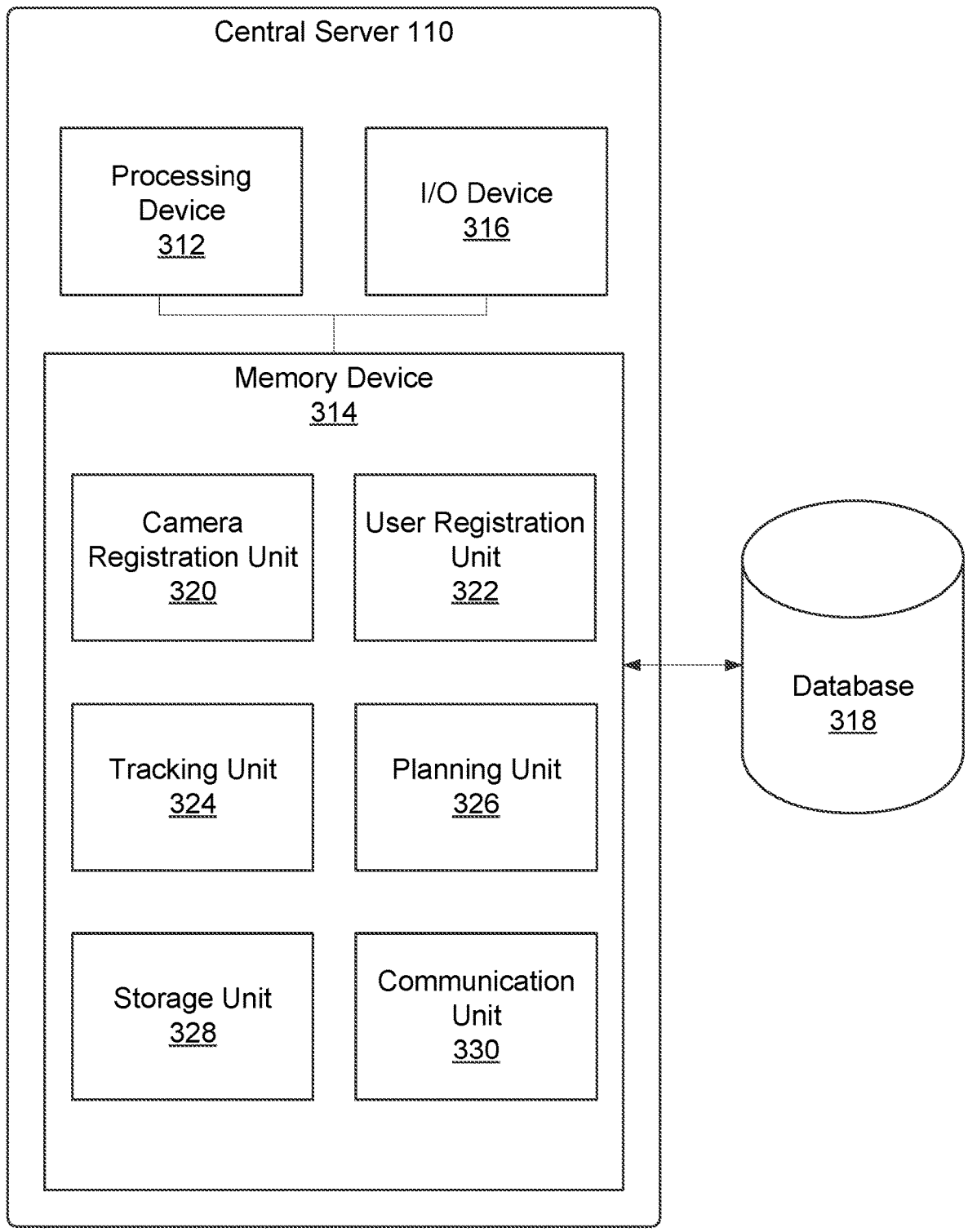
FIG. 3 depicts a schematic illustration of an exemplary embodiment of a central server, consistent with disclosed embodiments.
Figure 4:
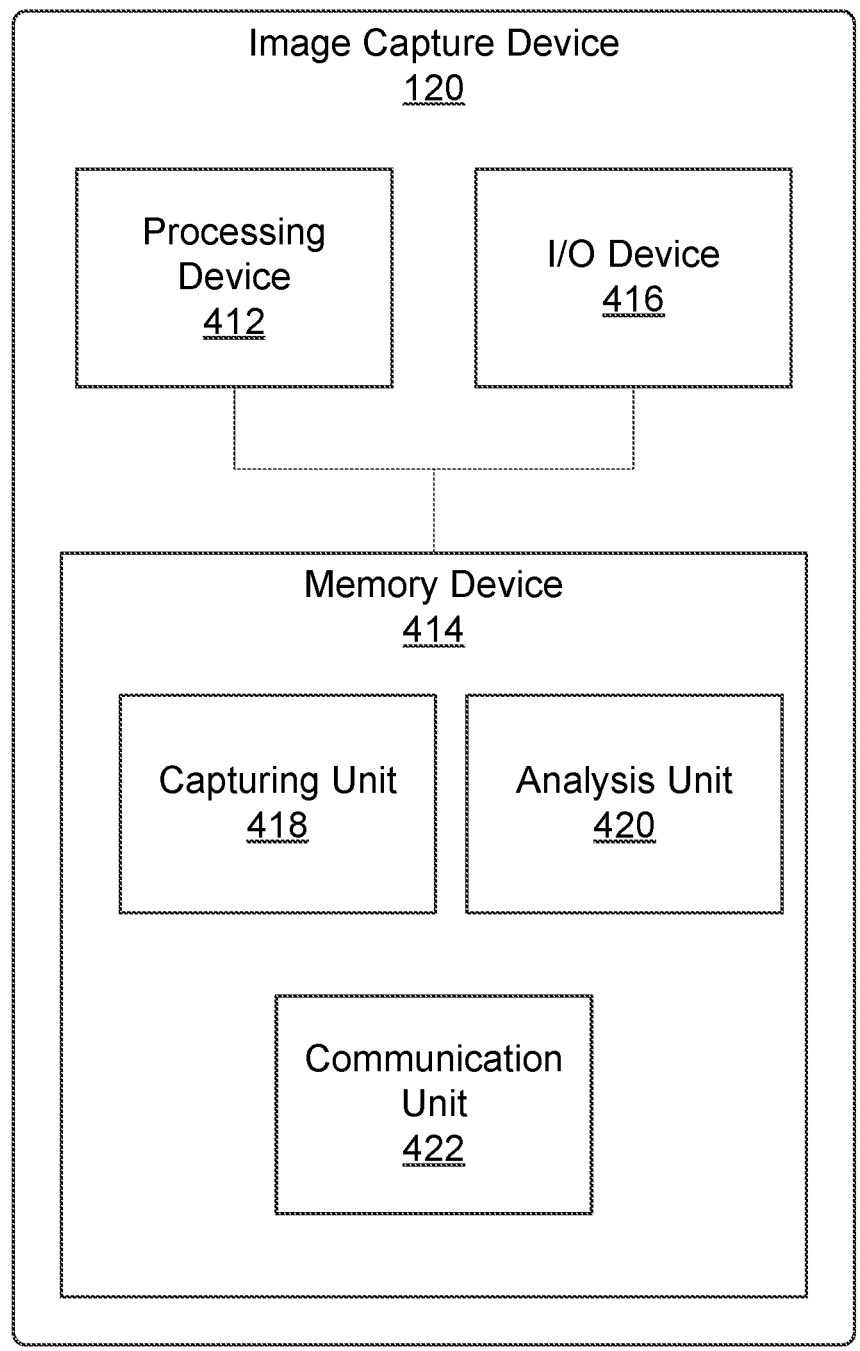
FIG. 4 depicts a schematic illustration of an exemplary embodiment of an image capture device, consistent with disclosed embodiments.
Figure 5:
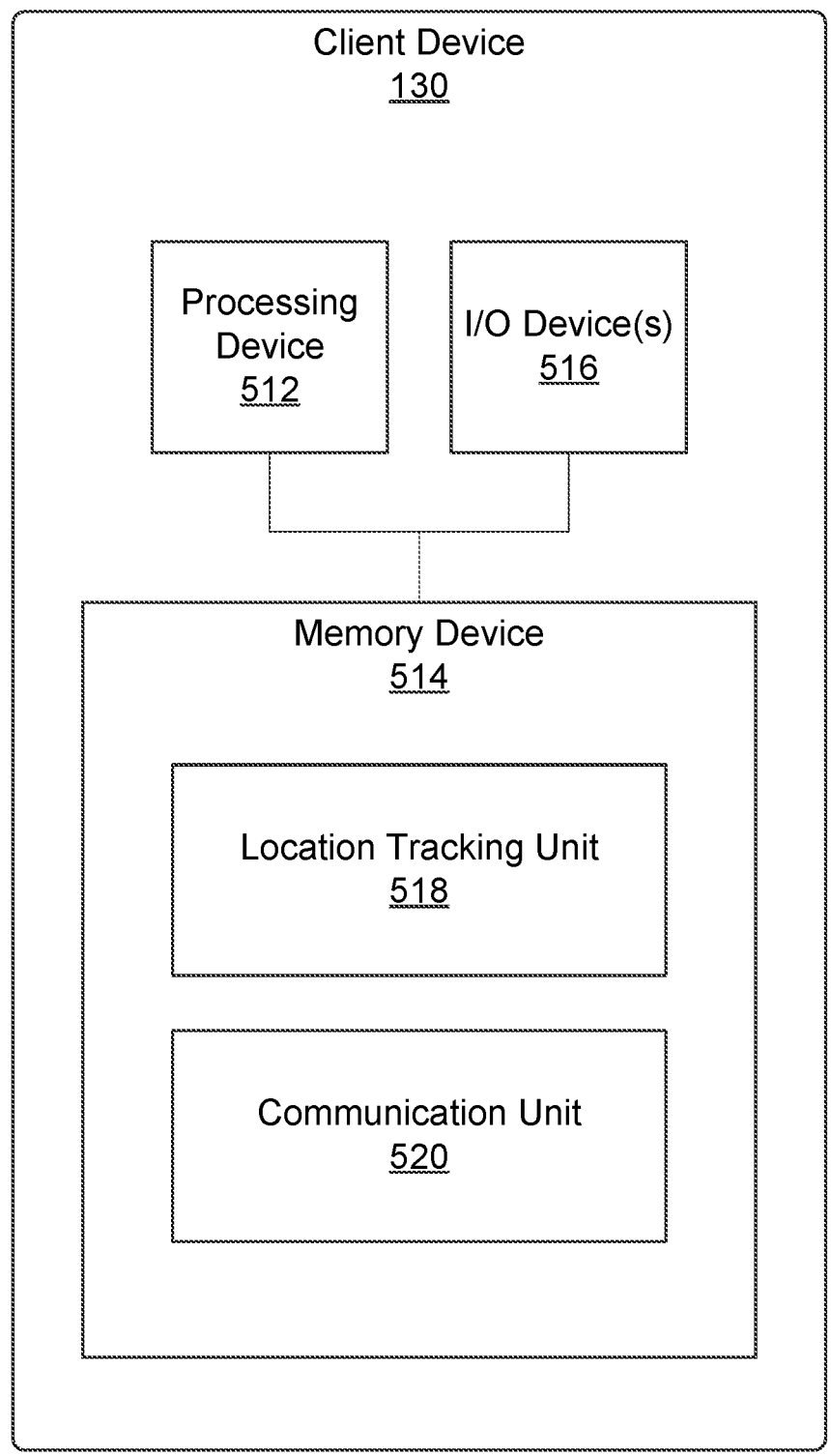
FIG. 5 depicts a schematic illustration of an exemplary client device, consistent with disclosed embodiments.

FIGS. 3-5 further illustrate exemplary system architecture of the life-logging system 100, including the central server 110 (FIG. 3), the image capture devices 120 (FIG. 4), and the client device 130 (FIG. 5). Each of the depicted components are exemplary and may be implemented as units, modules, databases, or other computing components in hardware or software or in a combination thereof. The exemplary components are configured to coordinate the capture, storage, and/or delivery of images of a user in which the central server 110 analyzes information to determine where a user is or will be located, identifies capture opportunities based on this information, communicates with the client device 130 in order to provide a capture itinerary to the user, and communicates with the relevant image capture devices 120 in order to capture images according to the capture itinerary. In this way, a calculated plan for obtaining images related to user's actions can be created and executed, instead of a steady stream of images which are captured without context or reasoning. Moreover, the use of a network of image capture devices which are strategically placed at particular locations allows the user to be placed in the images as well as certain aspects of the image capture process, such as angle, zoom, lighting, etc., to be controlled.

FIG. 3 is a schematic illustration of an exemplary embodiment of the central server 110. The central server 110 preferably includes one or more processing devices 312, one or more memory devices 314, one or more input/output (I/O) devices 316, and one or more databases 318. The one or more processing devices 312 are configured to execute software instructions stored in the one or more memory devices 314 to perform one or more processes associated with the lifelogging system 100. For example, the central server 110 may, through the one or more processing devices 312, create a life-logging network of a plurality of cameras which capture images of one or more users registered to the life-logging network, and deliver selected images to the client device 130 associated with the user. The I/O devices 316 may include data terminals which control the receipt and transmission of data to and from the central server 110. In some embodiments, the I/O devices 316 may include a camera and/or display device. The database(s) 318 may store information such as camera profile information and/or user profile information.

In an exemplary embodiment, the central server 110 further comprises one or more control units 320-330 that are implemented in hardware and/or software and which enable the central server 110 to perform one or more processes associated with the life-logging system 100. In some embodiments, the control units 320-330 are software modules stored in the one or more memory devices 314, but are not limited thereto. In one embodiment, the control units 320-330 include a camera registration unit 320, a user registration unit 322, a tracking unit 324, a planning unit 326, a storage unit 328, and a communication unit 330. It should be understood that these units are exemplary and may be combined and/or separated into additional units.

The camera registration unit 320 may be configured to register one or more of the image capture devices 120 into a life-logging network. For example, the camera registration unit 320 may connect to an image capture device 120, store a camera profile in association with the image capture device 120, and establish a connection between the image capture device 120 and the central server 110. In some embodiments, the camera registration unit 320 may establish a connection between the image capture device 120 and the client device 130. The camera registration unit 320 is responsible for maintaining and updating camera profiles and facilitating communication between the image capture device 120 and other components of the life-logging system 100. The camera registration unit 320 may store the camera profiles in the database 318.

The user registration unit 322 may be configured to register one or more users into the life-logging network. For example, the user registration unit 322 may create a user profile for each user, including a user associated with the client device 130. The user profile may include user preferences that identify one or more customized settings which pertain to and/or were selected by the user. The user registration unit 322 may establish a connection between the central server 110 and the client device 130. The user registration unit 322 may store, as part of the user profile, information that identifies the client device 130. The user registration unit 320 may store user profiles in the database 318.

The tracking unit 324, in one embodiment, controls the receipt of new information after a network of cameras and users are established as a life-logging network. The tracking unit 324 may be configured to communicate with image capture devices 120 and client devices 130 in order to receive updated information that pertains to the life-logging system 100. For example, the tracking unit 324 may send and receive information to and from the image capture devices 120 to continuously or periodically update camera profiles. In another example, the tracking unit 324 may receive information about images from image capture devices 120 (e.g., real-time data about an image that has been captured or could be captured). In another example, the tracking unit 324 receives updated information about a user from the client device 130. For instance, the tracking unit 324 may receive location information identifying a current or likely future location of a user.

The planning unit 326 is configured to analyze information in camera profiles and user profiles, as well as updated information about prospective images and users, to identify image capturing opportunities. For example, the planning unit 326 may be configured to compare current or likely future location of a user to known locations of image capture devices 120 to narrow a list of image capture devices 120 which may be used to capture an image of a user. The planning unit 326 may determine an itinerary including a plurality of locations associated with different image capture devices 120 for capturing images of the user. The planning unit 326 may analyze updated information received by the tracking unit 324 and already-stored images (or data about already-captured images) to make decisions about image capturing opportunities, such as which opportunities are likely to provide images which have some value to the user. For example, the planning unit 326 may consider whether an image capturing opportunity would result in an image which is different than other images of the user which have already been captured and stored.

The storage unit 328 is configured to control the selective storage and/or delivery of images captured by image capture devices 120. For example, the storage unit 328 may review user preferences to determine how to handle various images which are captured by image capture devices 120. The storage unit 328 may decide that certain images should be stored in the database 318 or other central repository, delivered to the client device 130 (either directly from the image capture device 120 or through the central server 110), or discarded. The storage unit 328 may analyze user preferences stored in a user profile and/or data associated with already-captured images to determine how to handle captured images.

The communication unit 330 is configured to facilitate data communication between components of the life-logging system 100. For example, the communication unit 330 may cause communication between the central server 110 and an image capture device 120 or the client device 130. In other embodiments, the communication unit 330 may facilitate communication between an image capture device 120 and the client device 130. For example, the communication unit 330 may provide an instruction for an image capture device 120 to deliver a capture image to the client device 130.

FIG. 4 is a schematic illustration of an exemplary embodiment of an image capture device 120. The image capture device 120 is preferably a device configured to capture images and/or record video, such as any of many commercially-available cameras that may be stand-alone or integrated into a specialized device. In an exemplary embodiment, the image capture device 120 may include a processing device 412, a memory 414, and an input/output (I/O) device 416.

The processing device 412 and memory device 414 may be general or specialized computing components configured to store and execute software instructions in order to carry out one or more of the processes or steps described herein. The I/O device(s) 416 may include an image input device (e.g., the image-capturing components of a camera) and, in some embodiments, an audio input device configured to capture audio data. The I/O device(s) 416 may be configured to capture an image based on instructions from the processing device 412 and produce corresponding image data for use within the life-logging system 100, such as for producing viewable images and/or videos for a user. The I/O device(s) 416 also may include a network connection component which allows the image capture device 120 to connect to the network 140 and/or directly connect to other elements of the life-logging system 100. For example, the image capture device 120 may include Wi-Fi, Ethernet, and/or Bluetooth® capabilities.

In an exemplary embodiment, the image capture device 120 further comprises one or more control units 418-422 that are implemented in hardware and/or software and which enable the image capture device 120 to perform one or more processes associated with the life-logging system 100. In some embodiments, the control units 418-422 are software modules stored in the one or more memory device(s) 414, but are not limited thereto. In one embodiment, the control units 418-422 include a capturing unit 418, an analysis unit 420, and a communication unit 422. It should be understood that these units are exemplary and may be combined and/or separated into additional units.

The capturing unit 418 may control a feed of image and/or audio data from an associated I/O device 416. For example the capturing unit 418 may provide instructions to capture images, video, and/or audio using an appropriate I/O device 416. The capturing unit 418 may provide the data feed to other components within the image capture device 120 and/or life-logging system 100. The capturing unit 418 may control image capturing characteristics, such as angle, zoom, capture mode, resolution, etc. For example, the capturing unit 418 may provide an instruction to move a field-of-view of a lens, zoom in on a user, and capture a picture using selected capture settings.

The analysis unit 420 may be configured to analyze image and/or audio data from the capturing unit 418. For example, the analysis unit 420 may be configured to use facial recognition processing to identify a user in image data. The analysis unit 420 may identify image characteristics, such as lighting, angle, field-of-view, distance to a user, whether a user is looking at the image capture device 120, whether there are multiple people in the image, etc. In some embodiments, the analysis unit 420 may be configured to compare image data to previously-captured image data and determine whether the recent image data represents a new image or variation from the previous images.

The communication unit 422 is configured to facilitate data communication between components of the life-logging system 100. For example, the communication unit 422 may cause communication between the image capture device 120 and the central server 110, the client device 130, or another image capture device 120 connected to the network 140. In one embodiment, the communication unit 422 directs image data (e.g., of captured images) to another component of the life-logging system 100. For example, the communication unit 422 may instruct the capturing unit 418 to deliver captured images to a particular client device 130, such as a client device 130 associated with a user in the captured images.

FIG. 5 further illustrates an exemplary embodiment of the client device 130. As described herein, the client device 130 may be a user-interfacing device which receives input from the user and provides output to the user. The client device 130 may include a processing device 512, a memory device 514, and one or more input/output (I/O) devices 516. The client device 130 is associated with a user, but may be associated with multiple users. Further, multiple client devices 130 may be associated with a single user. The client device 130 may store (e.g., in the memory device 514), a user profile identifying a user and including user information, such as user preferences. In some embodiments, the client device 130 may include an image repository (e.g., in the memory device 514 or other storage device) for storing images acquired through the life-logging system 100.

The processing device 512 and memory device 514 may be general or specialized computing components configured to store and execute software instructions in order to carry out one or more of the processes or steps described herein. The I/O devices 516 preferably include components configured to receive user input and provide output to a user such a touchscreen or other display, microphone, speaker, etc. For example, the client device 130 is preferably configured with a display for presenting information (e.g., images) to the user. In some embodiments, the I/O devices 516 may include a tracking device such as a GPS device configured to receive or measure location data as input and provide such data to other components of the client device 130.

The client device 130 may be a mobile device, laptop, desktop, or other computing device available to the user. The client device 130 may be a commercially-available device, such as any of a variety of smart phones, or tablets. In other embodiments, the client device 130 may be a specialized device for implementing the life-logging system 100. The client device 130 also may include a network connection component which allows the client device 130 to connect to the network 140 and/or directly connect to other elements of the life-logging system 100. For example, the client device 130 may include Wi-Fi, Ethernet, and/or Bluetooth® capabilities.

In an exemplary embodiment, the image capture device 120 further comprises one or more control units 518-520 that are implemented in hardware and/or software and which enable the client device 130 to perform one or more processes associated with the life-logging system 100. In some embodiments, the control units 518-520 are software modules stored in the one or more memory devices 514, but are not limited thereto. In one embodiment, the control units 518-520 include a location tracking unit 518 and a communication unit 522. It should be understood that these units are exemplary and may be combined and/or separated into additional units.

The location tracking unit 518 is configured to identify a location of a user associated with the client device 130. For example, the location tracking unit 518 may receive an updated stream of GPS data from a location tracking device within or connected to the client device 130. Such location tracking devices are commonly integrated into devices such as smart phones, tablets, smart watches, laptops, etc. The location tracking unit 518 is configured to control location data and transmit the location data to other components of the life-logging system 100. In some embodiments, the location data may be location information derived from other sources (i.e., other than GPS data). For example, the location tracking unit 518 may review schedules, appointments, emails, text messages, or the like to identify likely future locations of the user. In another example, the location tracking unit 518 may analyze a history of location data and a timing of the user being at various locations to predict a likely future location of the user. For example, the location tracking unit 518 may determine that every weekday morning the user travels from their home location to their work location. The location tracking unit 518 is thus not limited to tracking an "actual" location of the user and may utilize methods to determine likely future locations of the user.

The communication unit 520 is configured to facilitate data communication between components of the life-logging system 100. For example, the communication unit 520 may cause communication between the client device 130 and the central server 110, an image capture device 120, or another client device 130 connected to the network 140. In one embodiment, the communication unit 520 directs location data collected by the location tracking unit 518 to another component of the life-logging system 100. For example, the communication unit 520 may direct location data to the central server 110.

In some embodiments, the communication unit 520 may be a mobile application which is configured to be executed by the processing device 512 in order to provide a life-logging application to the user. For example, the client device 130 may be a smart phone which stores the life-logging application in the memory device 514 and which allows the user to control their experience with the life-logging system 100. The mobile application may present one or more user interfaces to the user, including but not limited to a user preferences input interface, an itinerary display interface, and a captured image viewing interface.

Figure 6:
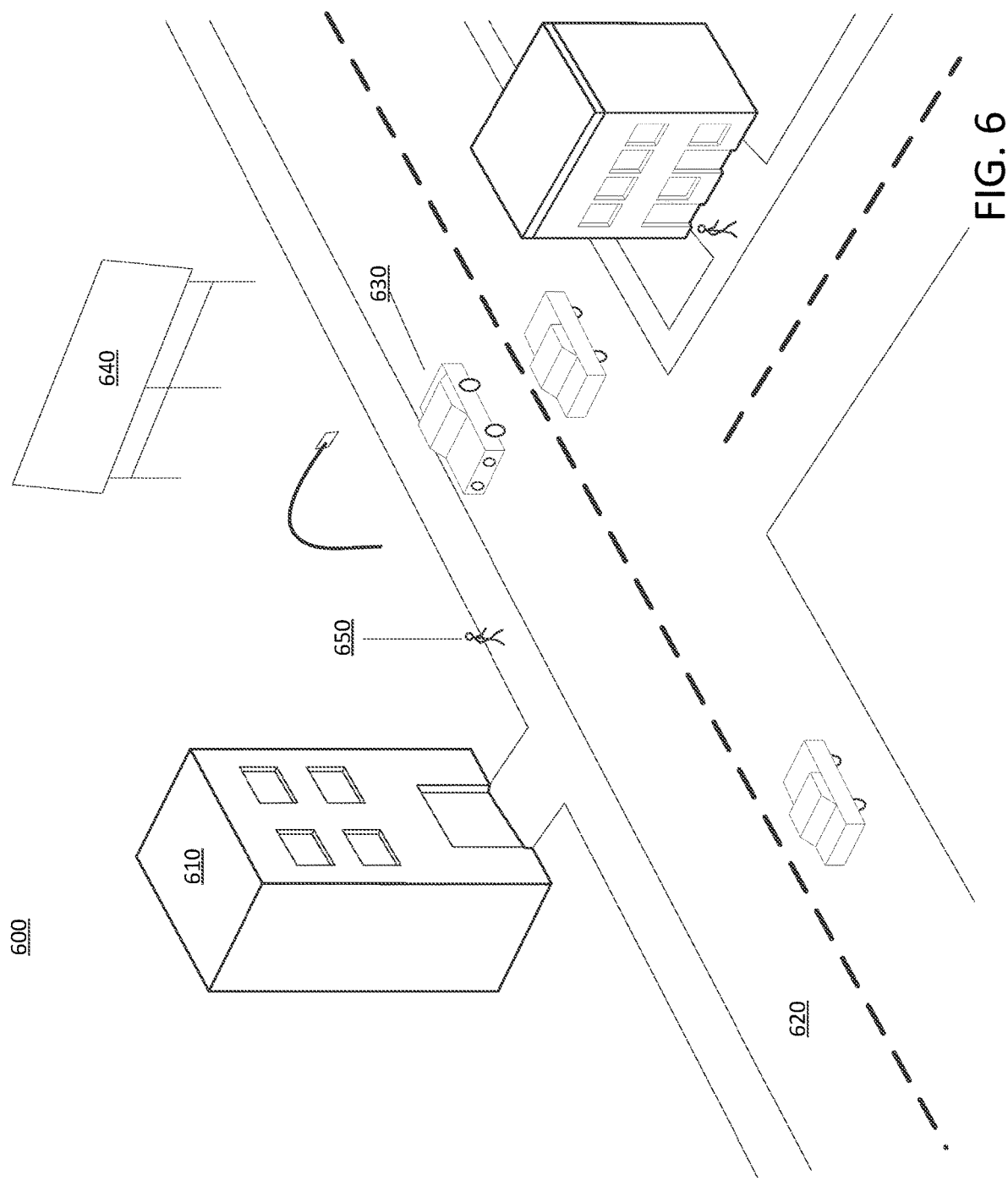
FIG. 6 illustrates an exemplary environment in which the disclosed life-logging system may be implemented, consistent with disclosed embodiments.

FIG. 6 is a schematic illustration of an environment 600 which is an example of a location in which the life-logging system 100 may be implemented. The environment 600 includes typical environmental features that are typically found throughout most populated areas. For example, the environment 600 includes a plurality of buildings 610, roads 620, vehicles 630, billboards 640, and people 650.

The life-logging system 100 of disclosed embodiments differs from many previous life-logging systems 100 in that it does not depend solely on the user providing an image capture device 120 to capture images as the user goes about their day. Instead, the life-logging system 100 relies on a network of image capture devices 120 which are dispersed throughout their environment. In the context of environment 600, that may include image capture devices 120 associated with the buildings 610, roads 620, vehicles 630, billboards 640, people 650, or any other elements of the user's environment. For example, buildings 610 may include security cameras or surveillance cameras, roads 620 may include traffic cameras or speed cameras, vehicles 630 may include dashboard-mounted cameras, billboards 640 may be outfitted with cameras aimed at viewers, and people 650 may be carrying their own cameras, such as conventional cameras, camera phones, person-mounted cameras, drone cameras, etc. The image capture devices 120 are thus spread throughout the environment of a user and may be used to capture images of the user at specific times when it is known or expected that the user will be in view of the camera. Further, the image capture devices 120 being dispersed in this manner provides a variety of capturing capabilities and characteristics (e.g., different angles and perspectives, distances from a user, image qualities, capturing modes, etc.). Moreover, because the image capture devices 120 are not carried or attached to the user themselves, the user is able to more easily appear in the images.

Figure 7:
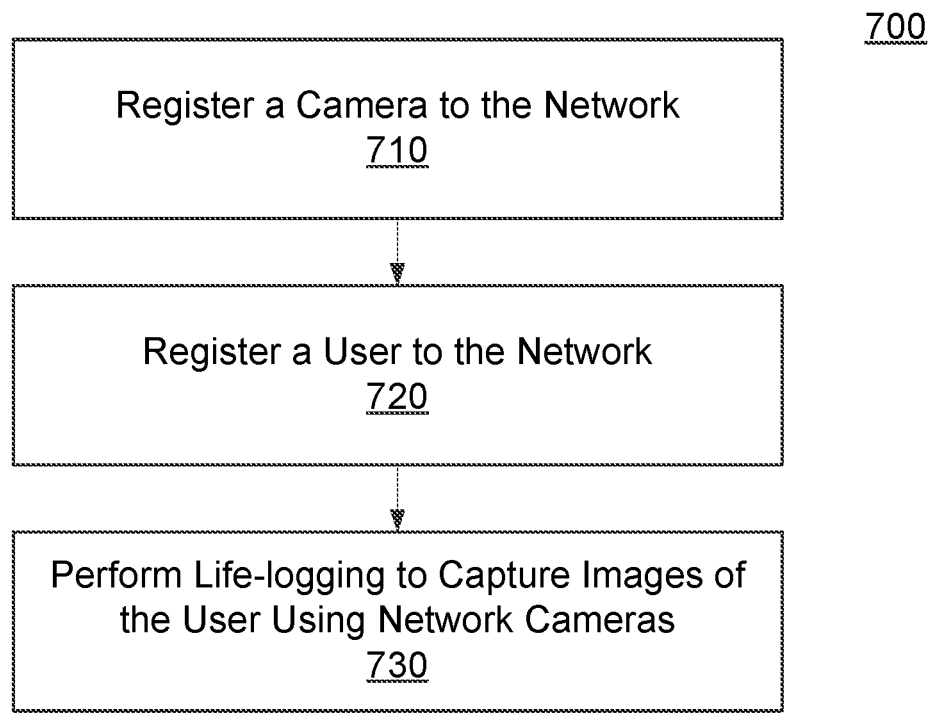
FIG. 7 illustrates a flowchart of an exemplary life-logging process, consistent with disclosed embodiments.

FIG. 7 is a flowchart of an exemplary life-logging process 700. One or more components of the life-logging system 100 may perform one or more steps of the life-logging process 700 in order to provide a user with a selected group of captured images associated with the user's activity. The life-logging process 700 may be a general process for establishing a life-logging network which the user may interact with in order to obtain the captured images.

In step 710, the life-logging system 100 may register a camera (i.e., an image capture device 120) to the life-logging network. For example, the camera registration unit 320 of the central server 110 may receive information about a camera and register the camera by creating or locating a camera profile to associate with the camera. The camera registration unit 320 may repeat step 710 in order to register a plurality of image capture devices 120. For example, each of the image capture devices 120 depicted in the environment 600 of FIG. 6 may be registered to the life-logging network with associated camera profiles.

In step 720, the life-logging system 100 may register a user to the life-logging network. For example, the user registration unit 322 of the central server 110 may receive information about a user and register a user by creating or locating a user profile to associate with the user. In some embodiments, the user registration unit 322 may associated one or more client devices 130 with a user or user profile. The user registration unit 322 may repeat step 720 to register a plurality of users to the life-logging network.

In step 730, the life-logging system 100 may perform life-logging to capture images of a user registered to the life-logging network using image capture devices 120 registered to the life-logging network. For example, one or more image capture devices 120 may receive instructions which indicate a location or likely future location of a user and/or instructions to capture images of the user. For instance, the central server 110 may determine a location of a user based on a location of the client device 130, identify an image capture device 120 which is in range of the user, and instruct the image capture device 120 to capture an image of the user. In another embodiment, an image capture device 120 may detect that a user is in a field of view, for example through facial recognition and/or communication with a client device 130, and capture an image of the user. The life-logging system 100 may arrange to provide the captured images to the client device 130 for displaying to the user. For example, the central server 110 may gather all captured images of or associated with a user and direct them to the client device 130 associated with the user. In some embodiments, the image capture devices 120 may directly send captured images to the client device 130.

Figure 8:
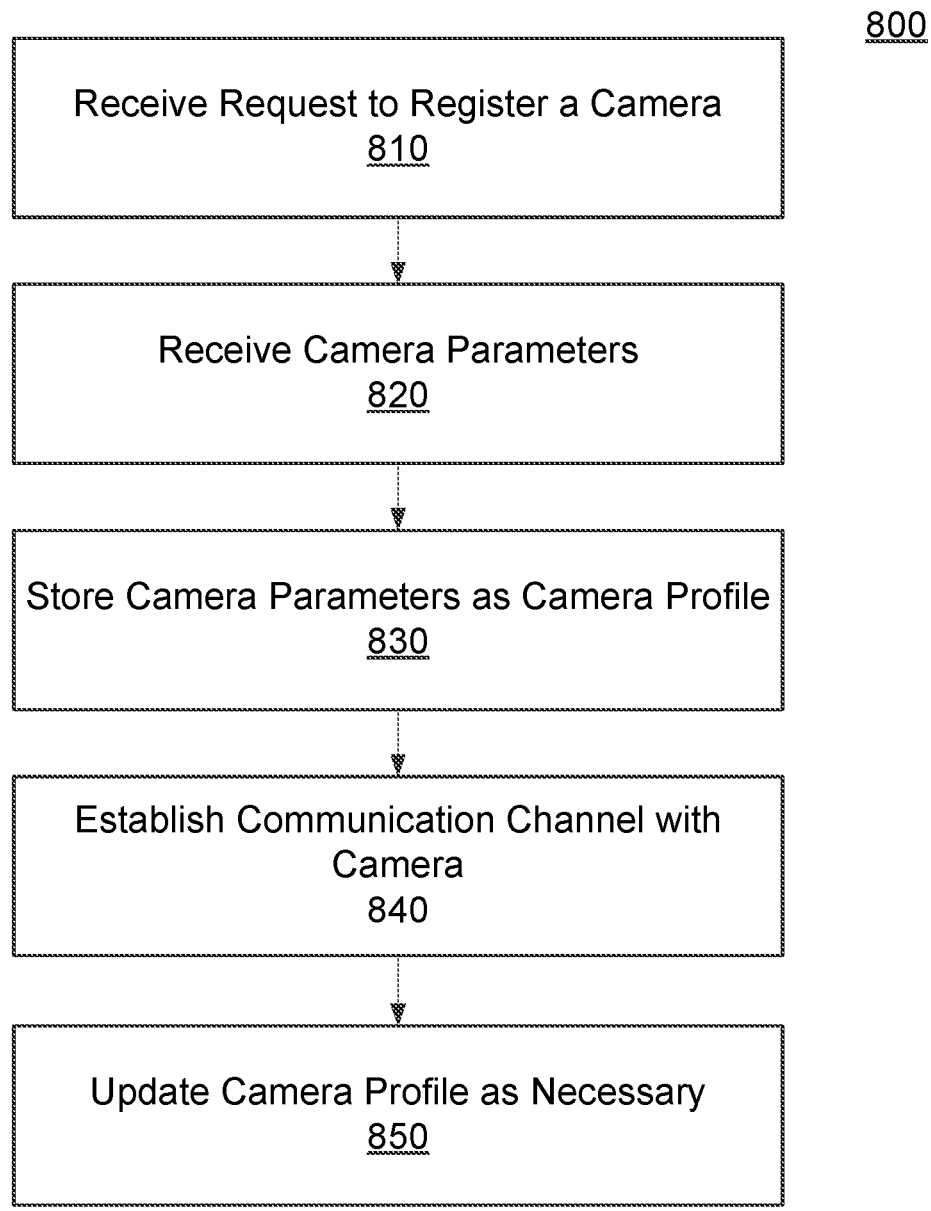
FIG. 8 illustrates a flowchart of an exemplary camera registration process, consistent with disclosed embodiments.

FIG. 8 is a flowchart of an exemplary process 800 for registering a camera to the life-logging network. In some embodiments, the process 800 may correspond to step 710 of the process 700. The central server 110 may perform one or more steps in order to register a camera (i.e., an image capture device 120). For example, the camera registration unit 320 may register a camera through process 800.

In step 810, the camera registration unit 320 receives a request to register a camera. For example, the camera registration unit 320 may receive data from an image capture device 120 requesting that the image capture device 120 be added to the life-logging network. The request may originate from the image capture device 120 (e.g., through a user providing input) or through another device possessing information about the image capture device 120 sufficient for it to become registered.

In step 820, the camera registration unit 320 receives camera parameters associated with the camera. The camera parameters may include information which define the setting and/or capabilities of the image capture device 120. The camera parameters may include, for example, location, field-of-view, capture capabilities (e.g., capture modes, lighting, zoom, resolution, angle, etc.).

In step 830, the camera registration unit 320 stores camera parameters as a camera profile. For example, the camera registration unit 320 may store a camera profile in the database 318 for each image capture device 120. In this way, the central server 110 may manage a network of cameras that make up a life-logging network. In step 840, the camera registration unit 320 establishes a communication channel with the camera. The camera registration unit 320 may establish a communication channel that allows data to be sent from an image capture device 120 to the central server 110, and vice versa.

In step 850, the camera registration unit 320 updates the camera profile as necessary. For example, the camera registration unit 320 may update camera parameters based on information received through the communication channel, such as a change in angle, lighting, etc. In another example, the camera registration unit 320 may update an online/offline status of the image capture device 120 in the camera profile, such as in instances when an image capture device 120 is unavailable. For instance, for an image capture device 120 associated with a dashboard cam or a personal camera carried by a person may not always be available for capturing images.

Figure 9:
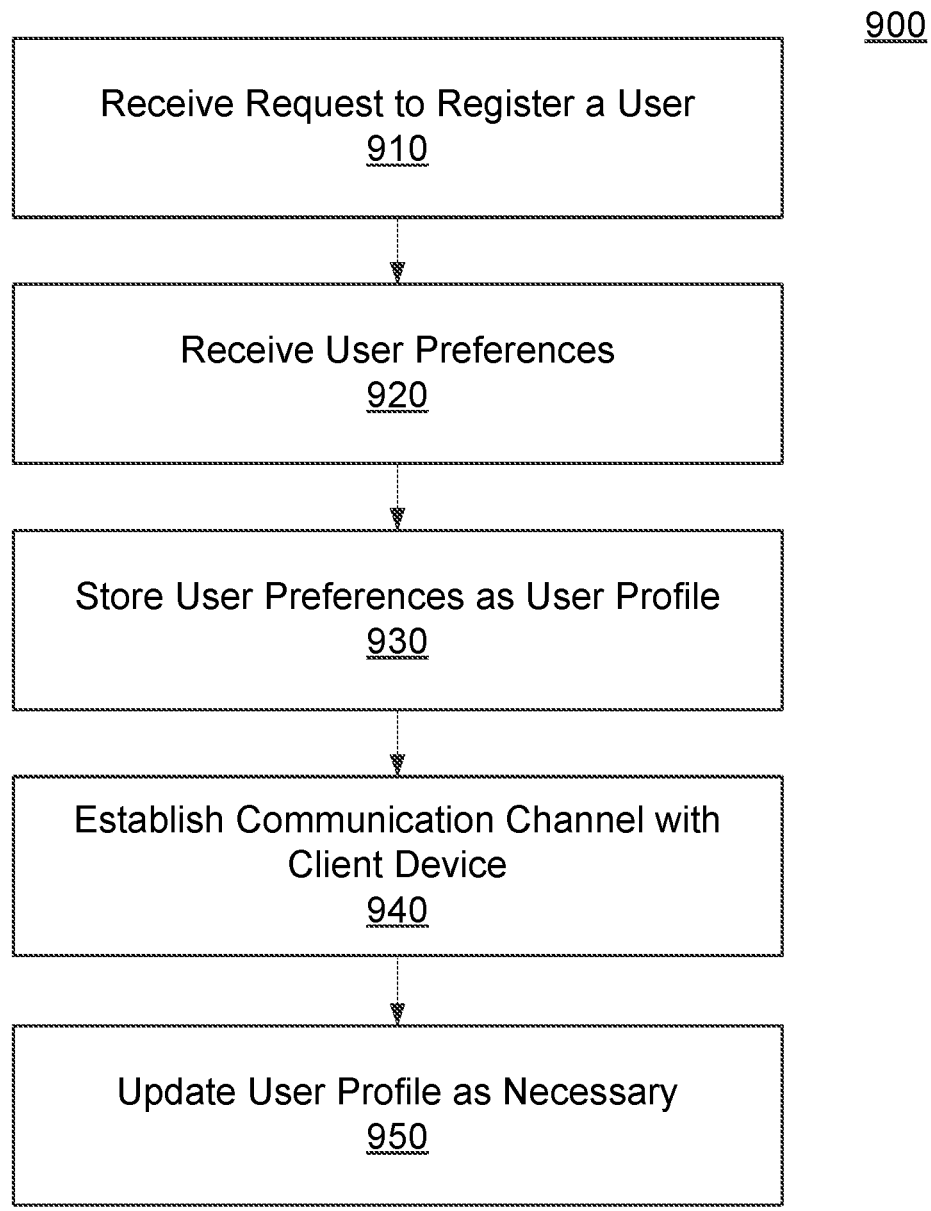
FIG. 9 illustrates a flowchart of an exemplary user registration process, consistent with disclosed embodiments.

FIG. 9 is a flowchart of an exemplary process 900 for registering a user to the life-logging network. In some embodiments, the process 900 may correspond to step 720 of the process 700. The central server 110 may perform one or more steps in order to register a user (in association with one or more client devices 130) to the life-logging network. For example, the user registration unit 322 may register a user through process 900.

In step 910, the user registration unit 322 receives a request to register a user. For example, the user registration unit 322 may receive a request from a client device 130 to register a user to a life-logging network. The client device 130 may receive input from the user through a life-logging mobile application installed on the client device 130. The request may include identifying information enabling the central server 110 to create a registered account with the life-logging network. In one example, the identifying information includes one or more images of the user. These images may be used for facial recognition of the user in subsequent processes.

In step 920, the user registration unit 322 receives user preferences. The client device 130 may display a user registration interface that provides options for a user to select various user preferences related to life-logging services and the client device 130 may transmit those selections to the user registration unit 322. The user preferences may include options that define parameters around the capture of images, including parameters that help the central server 110 and/or image capture devices 120 decide when to capture and/or keep images. User preferences include, but are not limited to, elements of an image, image quality criteria, face visibility, novelty of an image, location of an image, and time elapsed between images.

A user preference related to the elements of an image may define parameters which define when an image should be captured or stored based on the people or things that are in the image. For example, a user preference may indicate that an image should be captured or stored when a user is present next to another person. In some further embodiments, the other person may be a known other user, such as a person with a relationship with the user and which is stored as part of the user profile.

A user preference related to image quality may define parameters about a threshold quality of image for an image to be captured or stored. For example, a threshold lighting, field-of-view, resolution, angle, or other capture setting may be a user preference. A user preference related to face visibility may indicate that an image should only be captured or stored when the user's face is visible in the image.

A user preference related to the novelty of an image may indicate the degree to which the user prefers to receive images which are unlike previously-received images. In previous life-logging systems, a camera may capture large amounts of images, most of which end up being repetitive and similar to other pictures. In disclosed embodiments, a user preference related to novelty of an image may be associated with a control process in which the central server 110, image capture device 120, and/or client device 130 compares the content and/or context of an image to previous images in order to filter out images which are the same or similar to previously-received images. In this way, the user may be presented with only unique and/or interesting images and is not flooded with a large amount of similar images.

User preferences related to the location of an image and/or the time between images may similarly filter out repetitive images or images that do not interest the user. For example, there may be certain image capture devices 120 that are only capable of capturing images at certain locations that do not interest the user or that have already captured images of the user and repeated images would not be valuable. Similarly, if a user frequents a particular location, enough time might not pass for there to be an interest or need for an additional image, so a threshold amount of time may be set before a new image is captured at a particular location.

The user preferences enable the user to customize the situations in which images are captured, thereby providing some control over the images that are received as a result of being registered with the life-logging network.

In step 930, the user registration unit 322 stores the user preferences as a user profile. For example, the user registration unit 322 may store a user profile in the database 318. The user registration unit 322 storing the user preferences as a user profile enables the central server 110 to apply the parameters associated with the user preferences to the processes of capturing, storing, and/or delivering images. The central server 110 may apply the parameters in order to filter out a subset of images that are ultimately provided to the user for viewing.

In step 940, the user registration unit 322 establishes a communication channel with a client device 130. The user registration unit 322 may establish a communication channel that allows data to be sent from the central server 110 to a correct client device 130, and vice versa. The communication channel may be encrypted in order to maintain the privacy of the user.

In step 950, the user registration unit 322 updates the user profile as necessary. For example, the user registration unit 322 may receive new user preference information from the client device 130 and update the user profile accordingly. In another example, the user registration unit 322 may utilize a learning algorithm to refine user preferences in the user profile. For example, the user registration unit 322 may continuously update user preferences related to novelty and image location as more images are captured, stored, and/or delivered to the user. In another example, the user registration unit 322 may receive feedback regarding previous images (e.g., whether the user liked the image or not, or a rating). The user registration unit 322 may utilize a learning module to update the user preferences according to the user feedback so that future images that are captured, stored, and/or delivered to the client device 130 conform to the user's preferred images.

Figure 10:
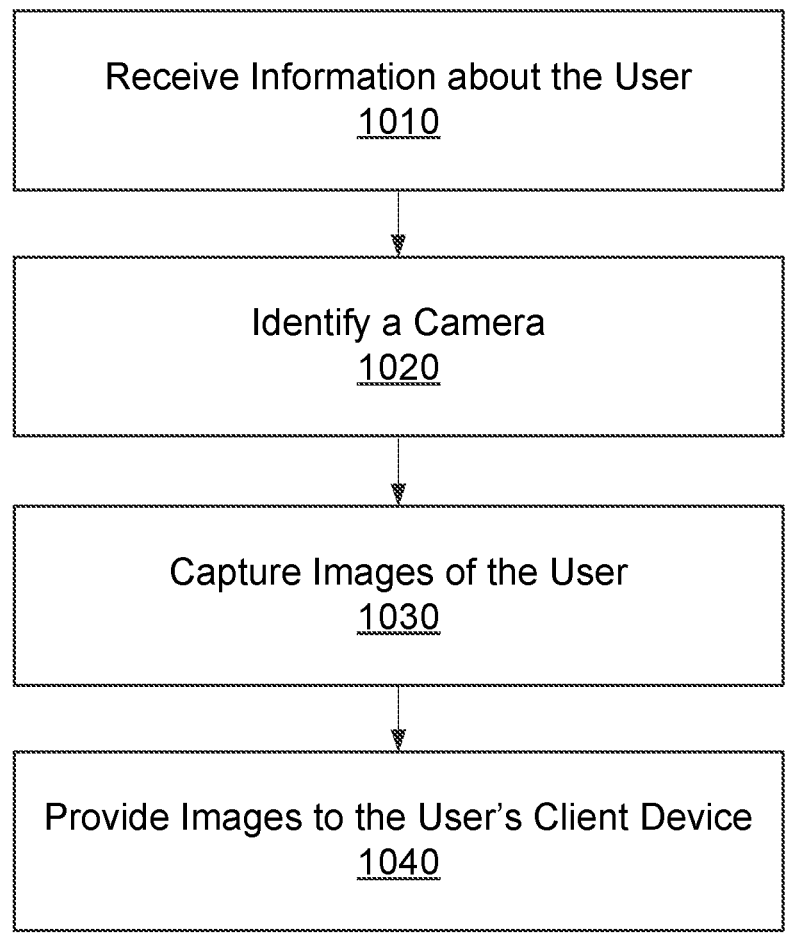
FIG. 10 illustrates a flowchart of an exemplary process for capturing images using a life-logging network, consistent with disclosed embodiments.

FIG. 10 is a flowchart of an exemplary process 1000 for providing life-logging images to a client device 130 via image capture devices 120. One or more components of the life-logging system 100 may perform one or more steps of the process 1000 in order to capture an image for a user participating in the life-logging network. For example, the central server 110 may perform process 1000. In some embodiments, the process 1000 may correspond to step 730 of the process 700.

In step 1010, the central server 110 receives information about the user. For example, the tracking unit 324 may receive location information from the client device 130. The location information may identify a current location or a likely future location of the user. For instance, the tracking unit 324 may receive a planned travel route from a travel application on the client device 130. The central server 110 may also identify a user profile associated with the user, including a client device 130 associated with the user.

In step 1020, the central server 110 identifies a camera from the plurality of image capture devices 120 that are registered to the life-logging network. For example, the planning unit 326 may compare the location of image capture devices 120 to the information about the user to identify one or more image capture devices 120 which are near the user or along a planned route of the user. In some embodiments, the planning unit 326 may analyze user preferences to identify cameras for capturing images.

In step 1030, the central server 110 may cause one or more image capture devices 120 to capture images of the user. For example, the central server 110 may transmit an instruction to one or more image capture devices 120 to capture images. The instruction may include information for when and/or how to capture the image and/or user profile information which allows the image capture device 120 to use facial recognition to identify the user and capture an image when the user is identified.

In other embodiments, an image capture device 120 may capture an image based solely on communication with the client device 130. For instance, an image capture device 120 may detect that the user is nearby (such as through a local connection to the client device 130 or facial recognition) and capture an image.

In step 1040, the central server 110 may arrange for the captured images to be provided to the client device 130 associated with the user. For example, the central server 110 may receive, at the storage unit 328, a plurality of captured images from the image capture devices 120. The storage unit 328 may identify a subset of the plurality of images to transmit to the client device 130 (e.g., based on user preferences).

Figure 11:
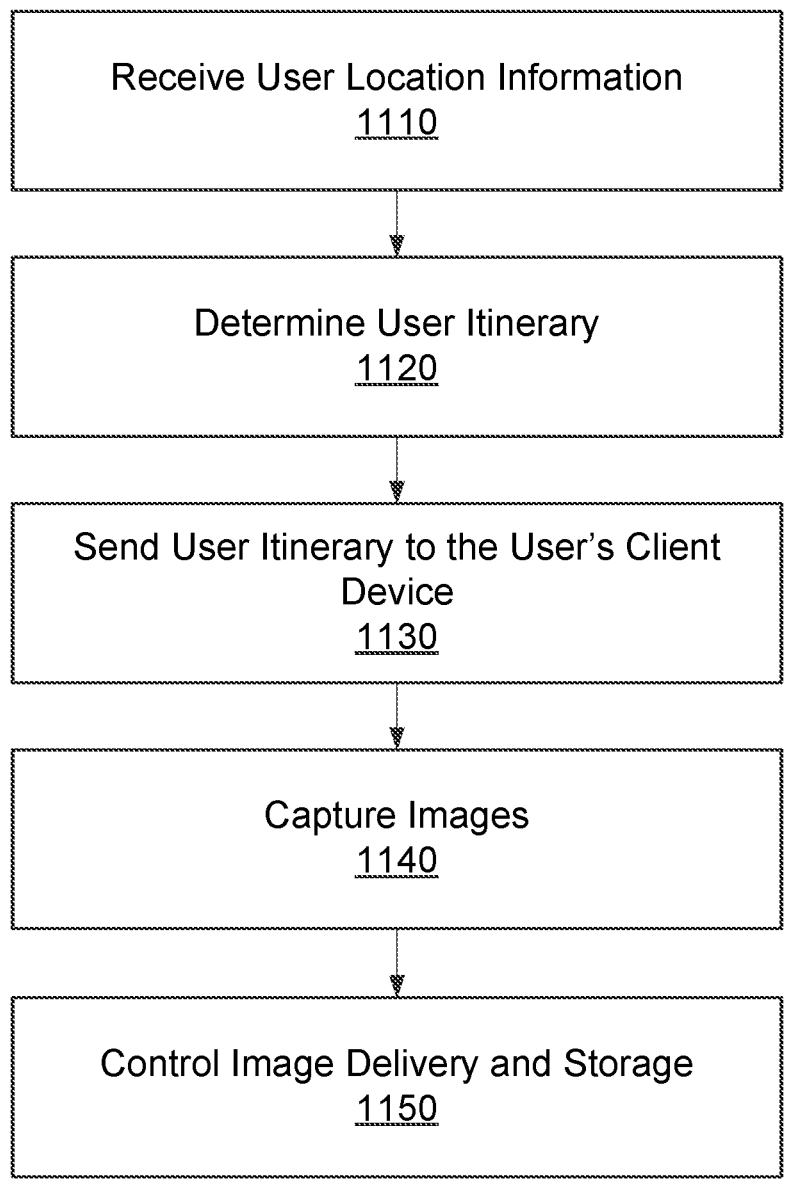
FIG. 11 illustrates a flowchart of an exemplary process for capturing images according to a user itinerary, consistent with disclosed embodiments.

FIG. 11 is a flowchart of another exemplary process 1100 for providing life-logging services using a network of registered image capture devices 120. One or more components of the life-logging system 100 may perform one or more steps of the process 1100 in order to provide life-logging services to a user. For example, the central server 110 may perform process 1100. In some embodiments, the process 1100 may correspond to step 730 of the process 700.

In step 1110, the central server 110 receives location information. For example, the tracking unit 324 may receive information indicating a likely future location of the user, such as a place to which the user will be traveling. The client device 130 may transmit the location information to the central server 110 and the tracking unit 324 may analyze the information to determine the likely travel of the user.

In step 1120, the central server 110 determines a user itinerary. For example, the planning unit 326 may analyze the location information as well as user preferences in an associated user profile and stored camera profiles to identify one or more image capture devices 120 that could be used to capture images of the user in conjunction with the user traveling to their intended destination. The planning unit 326 may prepare an itinerary in the form of a route for the user to take to reach their intended destination, with image capturing opportunities dispersed along the way.

In step 1130, the central server 110 sends the user itinerary to the client device 130. For example, the planning unit 326 transmits the user itinerary to the client device 130 such that the client device 130 may display the user itinerary to the user. The user itinerary may include, for example, a mapped route to take along with specific locations and/or times for image capturing opportunities. The user may follow the instructions associated with the user itinerary to be in the locations where images may be captured. In some embodiments, the planning unit 326 may send a notification to the client device 130 indicating that a particular even is occurring at particular location so that the client device 130 can notify the user of the potentially-interesting event with image capture opportunities.

In step 1140, the central server 110 causes images of the user to be captured by image capture devices 120. For example, the planning unit 326 may transmit instructions to the image capture devices 120 that are made a part of the user itinerary, including instructions for capturing images. The image capture devices 120 may follow these instructions in order to capture images of the user at appropriate times.

In step 1150, the central server 110 controls the delivery and storage of the captured images. For example, the storage unit 328 may receive the captured images and make decisions regarding retention and/or delivery. In some instances, the storage unit 328 may identify a subset of images based on user preferences and/or previously captured images. For example, if an image does not fit within a certain user preference or is duplicative of other captured images, the storage unit 328 may discard the image. The storage unit 328 may store the subset of selected images and/or deliver the subset of images to the client device 130 for being displayed to the user. In some embodiments, the storage unit 328 may not permanently store any images, thereby providing a security feature. Instead, the storage unit 328 may direct images to the client device 130 for storage. In some embodiments, the client device 130 may verify that the user of the client device 130 is the user in the images by verifying the person in the images matches live facial recognition data obtained through a camera (i.e., a camera integrated with the client device 130).

Figure 12:
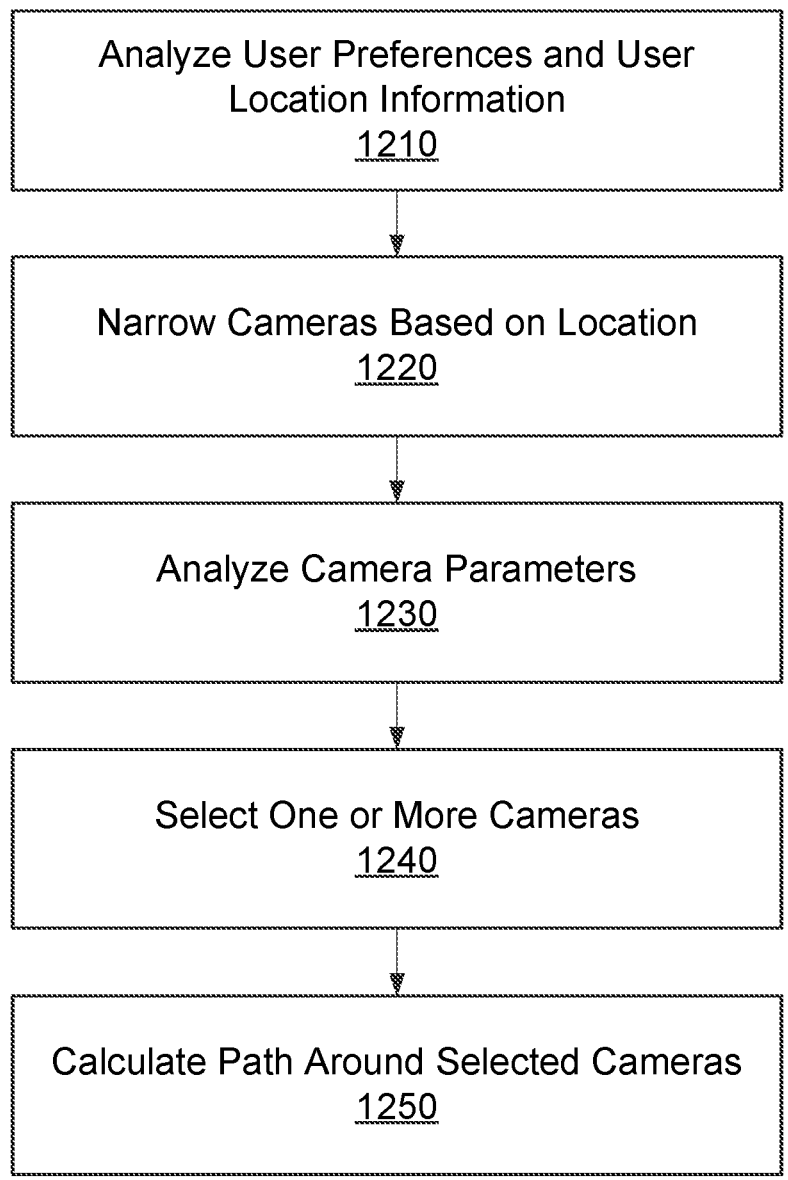
FIG. 12 illustrates a flowchart of an exemplary process for determining a user itinerary, consistent with disclosed embodiments.

FIG. 12 is a flowchart of an exemplary process 1200 for generating a user itinerary. One or more components of the central server 110 may perform one or more steps of the process 1200 in order to produce a travel plan for a user that coordinates image capture devices 120 with the users movement. In one embodiment, the planning unit 326 performs one or more steps of the process 1200 in order to produce the user itinerary.

In step 1210, the planning unit 326 analyzes user preferences and user location information. For example, the planning unit 326 may draw user preferences from a user profile and location information from a tracking unit 324. In step 1220, the planning unit 326 narrows a list of cameras based on the user location information. For example, the planning unit 326 may identify all of the image capture devices 120 that are within a particular range of the user or likely future locations of the user.

In step 1230, the planning unit 326 analyzes camera parameters. For example, for each narrowed camera, the planning unit may generate a plurality of scores based on user parameters. Scores may be associated with, for example, a predicted picture quality based on time, weather, past pictures, etc., estimated length or duration of detour (how far the imaging location is from the user's likely future location(s)), novelty of the picture, and predicted user feedback. Regarding novelty of the image, the planning unit 326 may analyze any characteristic of the image to determine whether the image is different than other images. When an out of the ordinary event is happening at a certain location, the image data from an associated image capture device may show the variety or novelty of the event and cause a novelty score to spike. Additionally, when a user is in an atypical location such as on vacation, the novelty score will be higher because previous images are not similar to the images at this location.

In step 1240, the planning unit 326 selects one or more cameras based on the narrowed list of cameras, the camera parameters, and the user preferences. For example, the planning unit 326 may identify one or more image capture devices 120 based on the scores determined in step 1230. If a particular score or set of scores are greater than a threshold, the image capture device 120 may be selected for capturing an image.

In step 1250, the planning unit 326 calculates a path around selected cameras. For example, the planning unit 326 may determine specific locations for each image capture device 120 to capture an image and then order the opportunities chronologically based on a route for the user to follow.

The process 1200 is one example of a manner in which the central server 110 may steer a user in the direction of an image capture device 120 for an image to be captured. It should be understood that other embodiments may utilize some of these steps and/or alternative methods in order to arrange for the user to coordinate with image capture device 120. For example, the central server 110 may communicate with the client device 130 to send messages, notifications, or alerts that inform the user of opportunities for images. In another example, the central server 110 may automatically adjust a user's planned travel route to include imaging stops along the way. Moreover, the central server 110 may be configured (e.g., via the tracking unit 324) to track a user's movements and update an itinerary or provide new messages to the client device accordingly. If a user deviates from a user itinerary, the central server 110 may update the itinerary accordingly with new image capture opportunities.

Figure 13:
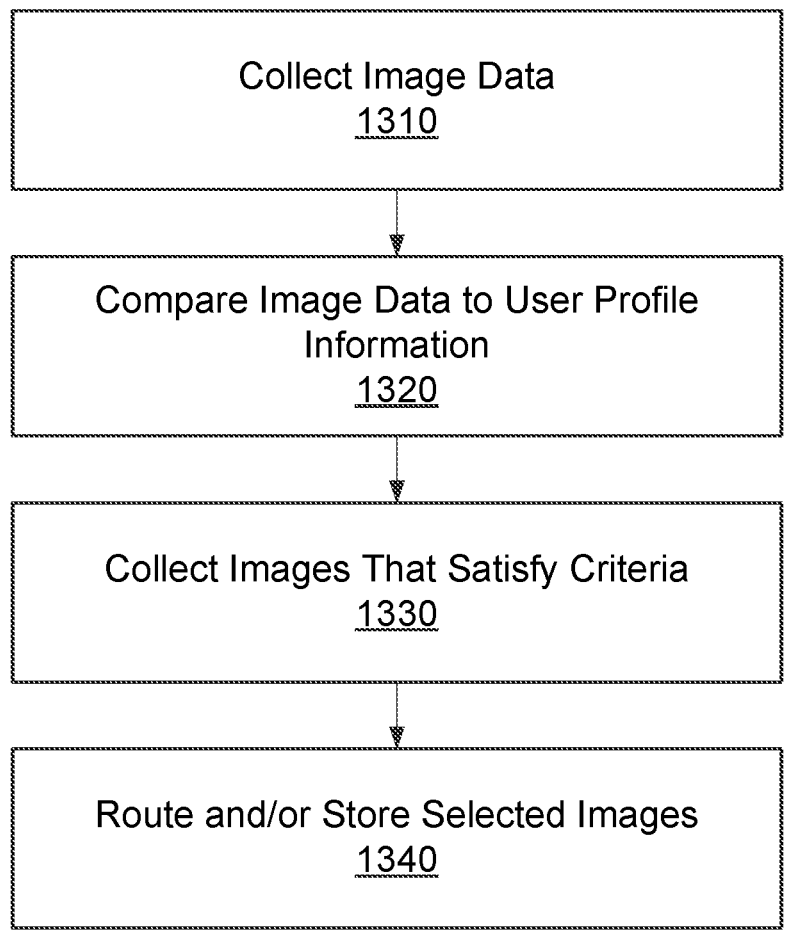
FIG. 13 illustrates a flowchart of an exemplary process for performing life-logging, consistent with disclosed embodiments.

FIG. 13 is a flowchart of an exemplary process 1300 for providing life-logging services to a user registered to the life-logging network. One or more components of the life-logging system 100 may perform one or more steps of the process 1300. In some aspects, the process 1300 may correspond to step 730 of the process 700 in order to provide life-logging services using registered cameras. For example, image capture devices 120 may perform one or more steps of the process 1300 in order to determine when to capture images. In other aspects, process 1300 may correspond to step 1150 of process 1100. For example, the central server 110 may perform process 1300 in order to provide a process for controlling the storage and/or delivery of captured images.

In step 1310, the life-logging system 100 collects image data. For example, the capturing unit 418 of an image capture device 120 may collect image input data, either by obtaining data which may be captured and/or by capturing images. The capturing unit 418 may continuously or periodically collect image data in order to receive information that identifies the environment in the field of view of the camera. In another example, the storage unit 328 may receive image data.

In step 1320, the life-logging system 100 compares image data to user profile information. For example, the analysis unit 420 may compare image data received in step 1310 to various user parameters stored as part of a user profile. In some embodiments, the central server 110 may receive the image data from step 1310 and perform the comparison.

In step 1330, the life-logging system 100 collects images that satisfy certain criteria, based on the comparison of image data and user preferences. For example, image capture devices 120 may utilize user preferences to determine situations when an image should be captured, stored, and/or transmitted to the client device 130. In one example, a user preference may indicate that one image should be captured by a camera whenever the user is in a certain location. The image capture device 120 and/or central server 110 may determine that the user is in the location (e.g., through location information and/or facial recognition) and capture an image.

In step 1340, the life-logging system 100 routes and/or stores selected images. For example, the storage unit 328 and/or communication unit 330 may transmit the selected images to the client device 130 for displaying to the user. In one embodiment, the life-logging system 100 directs an approved image to the client device 130 and the client device 130 notifies the user that they have a new image available. In another embodiment, the life-logging system 100 may send a batch of images at the end of a day.

The life-logging system 100 of the present disclosure provides an enhanced image-capturing network with a wide array of capabilities with less reliance on the user to arrange a set of interesting images that may be captured throughout the daily activities of the user. Moreover, the third-party view of the cameras provides a "selfie" appeal in which the users themselves may be in the images that are captured. Quality and variety of the images is also improved over typical life-logging cameras, as the images can be intelligently framed and timed and filtered according to user parameters. The present disclosure provides a system capable of learning user behavior, analyzing user preferences and an updated stream of captured images, and creating a user itinerary for capitalizing on opportunities for new, varied, and interesting images.

In one exemplary application of the life-logging system 100, a user leaves their home building in order to pick up their daughter from school. The user is already registered with the life-logging network and has a smart phone registered as the client device associated with their user profile in the central server. Digital billboards in the user's neighborhoods are equipped with cameras that are registered to the life-logging network. The central server determines that these billboard cameras have already captured many similar images, so they do not capture new ones. The billboard cameras do detect that the user is by themselves, while the user preferences indicate that the user prefers images with other people.

Once the user picks up their daughter from school, data is sent from the client device to the central server, and the central server predicts that the user and their daughter will travel back home. The central server identifies four cameras along the route (e.g., a billboard camera, a security camera, a dashboard camera, and an individual holding a camera). The central server analyzes the camera parameters and the user parameters and determines that the potential images form three of the cameras do not satisfy enough criteria to warrant an image being captured (e.g., the lighting is too dark, the camera is not facing a correct direction, etc.). The central server determines that the billboard camera in a particular location will be able to identify the user, zoom, and frame a good picture. The central server provides a notification to the user's client device providing instructions for taking advantage of the image capture opportunity and provides instructions to the billboard camera for capturing the image. At the right time, the billboard camera zooms and frame the image of the user and their daughter and delivers the image to the central server, which adds the image to the user's collection.

Along the way, a dashboard camera registered to the life-logging network detects the user and captures an image of the user. The image is sent to the central server but it is discarded because the user is not looking at the camera. Further, a kiosk near the user's home detects the user. Although this camera has taken many pictures of the user, an event is in view indicating that the picture would be novel. The kiosk camera captures a picture of the user viewing the event and transmits the image to the central server. The user and their daughter reach home and, upon connecting to their home Wi-Fi network, high-resolution images that were captured during their trip are automatically downloaded and viewable through the smart phone.

It should be understood that the above systems, processes, and examples do not limit further examples of the disclosed embodiments. For instance, while a central server is described, it should be understood that each client device may perform the functions of the central server. Moreover the environment of a city or neighborhood for logging daily activities of a user is also exemplary. In other embodiments, the life-logging system disclosed herein may be adapted to specific environments, such as an amusement park. A central server may connect to each camera in the amusement park (e.g., roller coaster cameras, security cameras, street photographers, etc.), capture images of the user throughout their time at the park, and provide a collection of images to the user throughout or at the end of their stay (e.g., for an additional fee).

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for capturing images of a user, comprising:
   receiving, by a camera registration unit, a plurality of camera profiles associated with a plurality of cameras;
   receiving, by a user registration unit, a user profile associated with the user, the user profile comprising user preferences;
   determining, by a tracking unit, location information associated with the user;
   determining, by a planning unit, a plurality of image capture opportunities based on the user location information, the user preferences, and camera parameters stored in the camera profiles;
   identifying, by the planning unit, one or more cameras of the plurality of cameras for each image capture opportunity, wherein identifying the one or more cameras comprises generating a plurality of scores and comparing the scores to the user preferences in the user profile, wherein the plurality of scores are associated with predicted picture quality, estimated length or duration of detour, novelty of the picture, and predicted user feedback;
   calculating a path around the identified one or more cameras;
   providing an itinerary comprising a different location and a different time point for each image capturing opportunity and the path, to a client device;
   providing instructions to the identified one or more cameras for capturing images of the user;
   arranging, by a communication unit, for the images of the user captured by the identified one or more cameras to be delivered to the client device; and
   verifying, by the client device, whether a person in the images is the user by comparing the person in the images with live facial recognition data of the user obtained through a camera of the client device.

2. The method as recited in claim 1, wherein each camera profile includes a location of a respective camera and identifying a camera for capturing an image of the user comprises comparing the location information to the camera locations.

3. The method as recited in claim 1, wherein each camera profile includes a camera parameter of a respective camera, the camera parameter being a characteristic of images captured by the respective camera, and wherein identifying the camera for capturing the image comprises comparing the user preferences to the camera parameters.

4. The method of claim 3, wherein the camera parameters include one or more of angle, zoom, capture mode, or lighting.

5. The method of claim 1, wherein the user preferences include elements of an image, image quality criteria, face visibility, novelty of an image, location of an image, and time elapsed between images.

6. The method of claim 1, wherein the location information includes a current location of the user based on information received from the client device.

7. The method of claim 6, wherein the information received from the client device includes GPS coordinates.

8. The method of claim 1, wherein the location information includes a likely future location of the user based on information received from the client device.

9. The method of claim 8, wherein the information received from the client device includes one or more of a planned travel route, previous travel information, or schedule information of the user.

10. A life-logging system, comprising:
    a processing device configured to execute instructions stored in a memory device to:
       register, by a camera registration unit, a plurality of cameras to a life-logging network;
       register, by a user registration unit, a user to the life-logging network;
       identify, by a planning unit, one or more cameras from the plurality of cameras, wherein identifying the one or more cameras comprises generating a plurality of scores and comparing the scores to user preferences in a user profile, wherein the plurality of scores are associated with predicted picture quality, estimated length or duration of detour, novelty of the picture, and predicted user feedback;
       receive a plurality of images of the user captured by the identified one or more cameras;
       analyze, by a storage unit, the plurality of images to select a subset of images from the plurality of images, wherein the subset of images are different from stored images in the storage unit, wherein the stored images are previous images of the user captured by the plurality of cameras;

deliver, by a communication unit, the subset of images to a client device associated with the user; and verify, by the client device, whether a person in the subset of images is the user by comparing the person in the images with live facial recognition data of the user obtained through a camera of the client device.

11. The life-logging system of claim 10, wherein the processing device is further configured to execute the instructions to select, by a planning unit, a camera of the plurality of cameras to capture an image and provide an instruction to the camera for capturing the images.

12. The life-logging system of claim 11, wherein the processing device is further configured to execute the instructions to provide a notification to the client device regarding the selected camera.

13. The life-logging system of claim 12, wherein the planning unit is further configured to determine an itinerary including a plurality of selected cameras and the notification to the client device includes the itinerary.

14. The life-logging system of claim 13, wherein the itinerary includes locations for image capture opportunities.

15. A life-logging system, comprising:
a processing device configured to execute instructions stored in a memory device to:
register, by a camera registration unit, a plurality of cameras to a life-logging network;
receive, by a tracking unit, an indication of a location of a user;
select, by a planning unit, one or more cameras of the plurality of cameras based on the location of the user, wherein selecting the one or more cameras comprises generating a plurality of scores and comparing the scores to user preferences in a user profile, wherein the plurality of scores are associated with predicted picture quality, estimated length or duration of detour, novelty of the picture, and predicted user feedback;
calculate, by the planning unit, a predicted picture quality score for each of the one or more cameras;
determine, by the planning unit, to capture an image of the user by a first camera selected from the one or more cameras, wherein the first camera has one or more predicted picture quality scores higher than one or more corresponding threshold scores predefined in user preferences of the user;
transmit, by a communication unit, an instruction to the camera to capture an image of the user based on the determination; and
verify, by a client device, whether a person in the captured image is the user by comparing the person in the captured image with live facial recognition data of the user obtained through a camera of the client device.

16. The life-logging system of claim 15, wherein the one or more corresponding threshold scores includes lighting threshold score, field-of-view threshold score, resolution threshold score, and angle threshold score.

* * * * *